Patented May 8, 1945

2,375,735

UNITED STATES PATENT OFFICE 2,375,735

PREPARATION OF PYRIMIDINES

Anthony M. Moos, Orangeburg, and Robert W. Price, Pearl River, N. Y., assignors to Lederle Laboratories, Inc., New York, N. Y., a corporation of Delaware No Drawing. Application November 8, 1941, Serial No. 418,320

2 Claims. (Cl. 260—251)

This invention relates to an improved method for preparing 2-substituted pyrimidines and more particularly relates to an improved process for the preparation of 2-amino pyrimidine.

Recently there has been an increased demand for various types of pyrimidines and pyrimidine derivatives. For example, 2-amino pyrimidine is an important intermediate for the preparation of 2-sulfanilamido pyrimidine.

In accordance with the present invention it has been discovered that alkoxyacrolein acetals, such as for example, beta-ethoxyacrolein diethyl acetal, can be condensed with amidines in acidic media to give good yields of 2-substituted pyrimidines. In a preferred embodiment of the invention beta-ethoxyacrolein diethyl acetal is condensed with a guanidine salt to produce 2-amino pyrimidine, the condensation being carried out in the presence of concentrated acids. The preferred acids are: sulfuric, hydrochloric, and phosphoric.

The invention will be described in greater detail in conjunction with the following specific examples which, however, are merely illustrative of the preferred methods of preparing representative compounds and are not intended to limit the scope of the invention.

Example 1

A solution of 3.80 grams of guanidine hydrochloride (0.04 mole) in 100 cc. of absolute alcohol was saturated with anhydrous hydrogen chloride while cooling in ice.

A solution of 3.48 grams beta-ethoxyacrolein diethyl acetal (0.02 mole) dissolved in 25 cc. absolute alcohol was then added dropwise with stirring over a period of one hour, with continued cooling.

After again passing in hydrogen chloride, the resulting solution was stirred for 1½ hours at room temperature and finally warmed to 70–80° C. under reflux for one hour. The solvent and excess acid were then removed under vacuum and the residue made strongly alkaline with 10 cc. of 50 percent aqueous sodium hydroxide. The liberated 2-amino pyrimidine was extracted with hot benzene, the extract dried over anhydrous magnesium sulfate and the pyrimidine hydrochloride precipitated by bubbling in hydrogen chloride. Yield, 1.37 grams (53%) M. P. 193–6° C. (uncorrected).

Example 2

0.01 mole of guanidine carbonate was condensed at room temperature with 0.02 mole of beta-ethoxyacrolein diethyl acetal, in a media of 5 cc. concentrated sulfuric acid, the mixture being allowed to stand over night. A yield of 36% of 2-amino pyrimidine was obtained.

Example 3

A condensation similar to that described in Example 2 was accomplished, with the exception that 10 cc. of concentrated acid was employed and the reaction was allowed to proceed at room temperature for one hour and the mixture then heated to 90° C. for 15 minutes. In this instance a 28% yield of 2-amino pyrimidine was obtained.

Example 4

0.02 mole of guanidine hydrochloride and 0.02 mole of beta-ethoxyacrolein diethyl acetal were combined in 10 cc of concentrated hydrochloric acid and allowed to remain at room temperature for one hour, the temperature then being raised to 80° C. for an hour. A 37% yield of 2-amino pyrimidine was obtained.

Example 5

A condensation similar to that described in Example 4 was accomplished, with the exception that alcoholic hydrogen chloride was employed as the reaction media and the reaction was allowed to proceed at room temperature. A 42% yield of 2-amino pyrimidine was obtained.

From the results obtained in the foregoing examples, it is readily seen that beta-ethoxyacrolein diethyl acetal can be condensed with a guanidine salt in the presence of concentrated acids to give good yields of 2-amino pyrimidine, and that when the reaction is carried out in an alcoholic solution excellent yields are obtained.

In the foregoing examples beta-alkoxyacrolein acetals may be employed instead thereof. During the condensation an alcohol is liberated and since the alcohol does not appear to effect the reaction, it is not important that any specific alkoxyacrolein acetal be employed. The beta-ethoxyacrolein acetal is preferred for economical reasons, there being no advantage in using other alkoxy derivatives which make the reaction more costly.

Acetals of the type considered, are known to hydrolyze readily in acid media. It is possible, therefore, that the pyrimidine is formed from one of the possible intermediate hydrolytic products, such as:

(1)   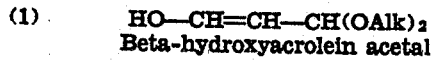
Beta-hydroxyacrolein acetal (2)

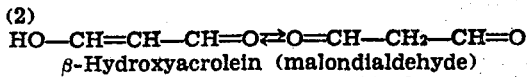

β-Hydroxyacrolein (malondialdehyde)

(3)  Alk—O—CH=CH—CH=O

Beta-alkoxyacrolein

Accordingly, the metal enolate derivatives (such as for example the alkali metal enolates) of the type:

(4)  Me—O—CH=CH(O—Alk)₂
(5)  Me—O—CH=CH—CH=O are applicable in the synthesis.

The alkoxyacrolein acetals employed may be prepared by known methods. One of these methods which we have found to be satisfactory for the preparation of beta-ethoxyacrolein diethyl acetal involves reacting acrolein with bromine to produce acrolein dibromide, which when reacted with ethyl alcohol in the presence of hydrochloric acid gives alpha-bromo-beta-ethoxypropanol-diethyl acetal, which is readily converted to beta-ethoxyacrolein diethyl acetal by treatment with alcoholic potassium hydroxide. In this reaction when some other aliphatic alcohol such as, for example, methyl-, propyl-, butyl-, amyl-, or the like, is used instead of ethyl alcohol, the corresponding alkoxyacroleins are obtained. These alkoxyacrolein derivatives may then be used for condensing with guanidine salts in accordance with the methods described in the specific examples.

The preferred process of this invention is that described in Example 1. In this preferred process, however, it is to be understood that alcohols other than ethyl alcohol may be employed for carrying out the reaction and any of the aliphatic alcohols, particularly those having boiling points low enough to permit them to be removed by distillation at a temperature below that at which 2-amino pyrimidine decomposes. Suitable alcohols include methyl-, propyl-, butyl-, amyl-, hexyl-, and the like.

The present invention operates effectively with substantially any guanidine salts. For practical purposes it is preferred to use the cheap guanidine salts, such as the sulfate, but the nature of the anion is not critical except in the case of acids which would be capable of reacting with the compounds produced, or with the reagents. Hence, other guanidine salts, such as the carbonate, hydrochloride, and the like, may be used.

When the process of the present invention is employed for the preparation of 2-substituted pyrimidines, other than 2-amino pyrimidine, guanidine is replaced in the reaction by some other amidine such as for example, urea, pseudo urea, thiourea, biguanide, guanyl urea, and the like. These acid amidines may be those of the aliphatic or the aromatic series. Hence, by replacing guanidine in the reaction with the beta-ethoxyacrolein acetal with some other amidine, compounds having the following general formula are obtained:

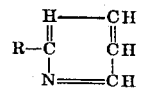

in which R equals -OH, -SH, -S alkyl, -H, alkyl, and -aryl. It is also possible that 4-, 5-, and 6-substituted pyrimidines could be prepared by using substituted beta-hydroxyacroleins.

We claim:

1. A method of producing 2 amino pyrimidine which comprises the steps of mixing together under substantially anhydrous conditions a guanidine salt, a beta alkoxyacrolein acetal, an anhydrous alcohol, and hydrogen chloride, and thereafter recovering the thus formed 2 amino pyrimidine.

2. A method of producing 2 amino pyrimidine which comprises the steps of preparing a substantially anhydrous solution of a guanidine salt and beta ethoxyacrolein di-ethyl acetal in anhydrous ethyl alcohol, adding thereto anhydrous hydrogen chloride and thereafter recovering the thus formed 2 amino pyrimidine.

ANTHONY M. MOOS.
ROBERT W. PRICE.